Dec. 15, 1964          J. E. AMES, JR          3,161,061
                    STRAIN GAUGE MOUNTING
Filed Aug. 16, 1961                     2 Sheets-Sheet 1

INVENTOR.
JOHN E. AMES, JR.
BY
Lippincott, Ralls & Hendricson
ATTORNEYS

United States Patent Office 3,161,061
Patented Dec. 15, 1964

3,161,061
STRAIN GAUGE MOUNTING
John E. Ames, Jr., Altadena, Calif., assignor to Fairchild Camera & Instrument Corporation, Syosset, Long Island, N.Y., a corporation of Delaware
Filed Aug. 16, 1961, Ser. No. 131,868
3 Claims. (Cl. 73—398)

The present invention is directed in general to the provision of a new and improved means of mounting strain-sensitive elements for gauges, and in particular, to the provision of improved mounting for sensor assemblies in pressure transducers.

In the application of strain-sensitive devices to pressure measurements, it is conventional to employ an element which deflects under applied pressure, and to translate this deflection by stress-strain relationships into pressure information. Improved strain-sensitive devices are extremely sensitive, and will respond to deformations of the order of fractions of microinches, so that it is necessary to protect the transducer sensing element from other sources of strain besides that to be measured. In more practical terminology, it has been found necessary to render transducer sensing elements insensitive to deformations of the protecting housing normally employed thereabout, and for many applications to render the pressure transducer insensitive to acceleration. With regard to this latter condition, it is noted that both steady-state and vibratory accelerations will produce sufficient deformations to introduce serious inaccuracies in the output of highly sensitive pressure transducers.

It is conventional in the mounting of strain-sensitive devices to employ quite massive protective housings, in order to minimize the possible deformation of such housing under normally encountered stresses. This approach to the problem does not provide a complete solution thereto, and is also highly disadvantageous for many applications wherein minimum size is of significant importance. As regards the isolation or protection of pressure transducers from acceleration effects, there have been proposed and provided various types of counterbalancing systems which commonly add unduly to the complexity of the overall device, and incidentally, introduce additional resonant frequencies in the apparatus, which are highly undesirable.

The present invention provides for the mounting of a strain-sensitive device, such as a pressure transducer in a minute and lightweight housing while yet isolating the transducer from various environmental effects normally tending to introduce undesirable stresses in the strain-sensitive device itself. A substantial insensitivity to mounting stresses and strains is achieved by the simplified and improved mounting means of the present invention. Prior-art difficulties resulting from thermal shock or accidental damage to the protective housing, for example, are almost entirely overcome by the mounting means hereof. In addition, there is provided hereby for the counteraction of acceleration effects on a strain gauge pressure transducer without the addition of spurious resonant frequencies in the device itself, and while yet maintaining a desired simplicity of construction.

It is an object of the present invention to provide an improved strain gauge mounting rendering the gauge itself insensitive to stresses and deformations of the protective housing.

It is a further object of the present invention to provide a lightweight and simplified strain gauge mounting structure, while yet attaining full gauge protection.

It is another object of the present invention to provide for the counteraction of acceleration effects on strain-gauge type pressure transducers.

A still further object of the present invention is to provide for a simplified mounting structure having the foregoing desired mounting characteristics, and yet attaining a simplicity of structure.

Various other objects and advantages of the present invention will become apparent to those skilled in the art from the following description of a particular preferred embodiment of the present invention. It is not, however, intended to limit the present invention by the terms of the following description, and instead, reference is made to the appended claims for a precise delineation of the true scope of this invention.

A single, preferred embodiment of the present invention is illustrated in the accompanying drawings, wherein.

Figure 1:
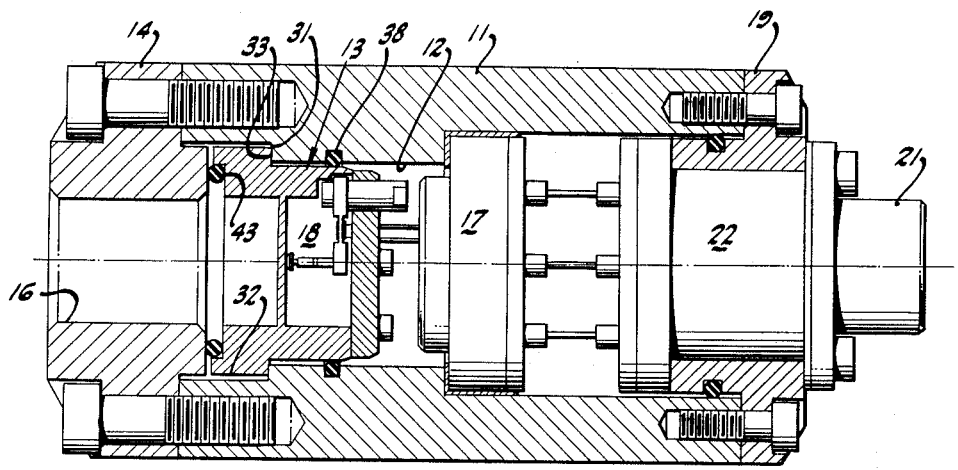
FIG. 1 is a longitudinal, sectional view through the protective housing and pressure transducer of the present invention.

Referring first to FIG. 1, there will be seen to be illustrated a protective housing 11, formed as an elongated cylinder with a central longitudinal bore 12 therethrough. The illustration is enlarged for clarity and an actual gauge may have about one-half the size shown. Within the cylinder 11 there is adapted to be disposed a capsule 13 containing a strain-sensitive device for producing indications of pressure acting through the front end of the cylindrical housing. The housing 11 is closed at the forward end thereof by a plate 14 having a pressure port 16 centrally therethrough. Suitable bolts may be employed about the circumference of this plate to firmly secure same to the remainder of the housing. Within the housing there may also be provided an amplifier assembly 17 electrically connected to the sensor assembly 18 within the pressure capsule, for the purpose of amplifying electrical signals produced by the sensor. The back end of the housing may be closed by a cover plate 19 bolted to the remainder of the housing and having an electrical connector 21 extending through the plate. This connector 21 may be internally wired to the amplifier 17, as by means of a terminal block 22 within the housing.

The above-enumerated elements disposed within the rear of the housing form no part of the present invention, but may be conveniently mounted within the elongated cylinder of the housing to form a unitary package of the pressure transducer illustrated, so that there is available from the rear of this single unit electrical signals indicative of pressure or pressure variations experienced at the pressure port 16 in the front of the housing. As above noted, the sensor assembly 18 is disposed within a capsule 13, and in order to fully protect this sensor assembly from extraneous stresses and strains, it is of great importance that the capsule 13 be protectively mounted within the protective housing. Although prior-art approaches to this problem have provided for the utilization of quite massive protective housings to the end of limiting deformations thereof, even under applied stresses, the present invention employs an alternative and highly improved approach to the mounting of the capsule 13.

Figure 2:
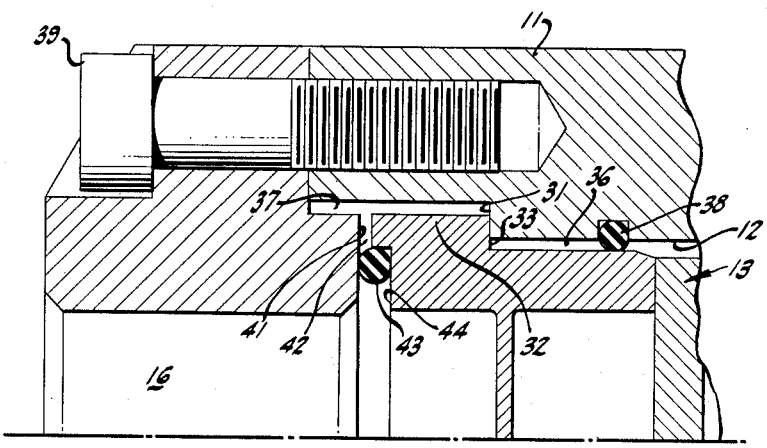
FIG. 2 is an enlarged partial sectional view illustrating the engagement of protective housing and pressure transducer capsule.

In accordance with the present invention, the capsule containing the sensor assembly is mounted within the protective housing to contact the cylindrical housing only in a single transverse plane therethrough. This is accomplished structurally by forming a shoulder 31 about the internal bore 12 of the housing with such shoulder facing the front, open end of the housing. The capsule 13 is formed as a cylinder having a lesser diameter than the bore 12 of the housing, and furthermore, is formed with a flange 32 about the forward end of the capsule. This flange 32 has a rear face 33 disposed in the plane which is normal to the axis of the capsule, and is adapted to bear directly against the shoulder 31 of the housing, which is formed in a plane that is perpendicular to the axis of the housing. The capsule flange 32 does not extend laterally outwardly of the capsule a sufficient distance to engage the longitudinal portion of the capsule bore. Thus, as illustrated in some detail in FIG. 2, the capsule 13 fits within the cylinder 11 with an annular space 36 about the main portion of the capsule. Similarly, an annular space 37 is provided between the outer edge of the capsule flange 32 and the expanded front portion of the cylinder bore. Centering of the capsule within the cylinder is accomplished by the provision of a resilient mounting ring 38, disposed about the capsule within the cylinder. In order to maintain this resilient ring in position, there many be provided, as illustrated, a slight indentation about the bore in the cylinder, adapted to seat the ring 38. This resilient mounting ring may be formed of rubber, or the like, or in the alternative, may be composed of a fluid seal of any one of various conventional configurations.

Further to the protective mounting of the sensor assembly within the protective housing, and referring again to FIG. 2, it will be seen that the front or cover plate 14 of the protective cylindrical housing 11 is firmly secured to the cylinder by bolts 39, and is dimensioned to dispose the inner face 41 of this plate in spaced relation to the front face of the sensor assembly capsule. There is thus provided a space 42 between the capsule and cover plate 14. Maintenance of the capsule in spaced relation to the cover plate of the cylinder is accomplished by the provision of a resilient mounting ring 43, disposed in an indentation 44 in the front of the sensor assembly capsule 13. This mounting ring 43 may, for example, be formed of rubber or other resilient material, or alternatively, may be formed as a type of fluid seal, if desired.

With the above-described structure for mounting the sensor assembly capsule within the protective housing 11, it will be seen that the sole direct contact between the capsule and housing occurs at the contacting faces 31 and 33, disposed in a plane transversely through both capsule and housing. An annular bearing surface is thus formed against which the sensor assembly capsule presses when forces are applied through the pressure port 16 of the housing against the capsule itself. The protective housing is formed as a relatively elongated narrow cylinder, and extensive testing of this manner of mounting has established the independence of the sensor assembly from effects other than pressure applied through the port in the front of the housing. Rapid or extensive variations in temperature introducing thermal shock to the apparatus do not materially affect the sensor assembly itself, inasmuch as the pressure capsule is quite able to expand or contract independently of the protective housing. Furthermore, stresses applied to the housing itself which introduce strains in the materials thereof, do not result in the transmittal of these stresses to the sensor assembly for only a single bearing surface exists between the protective housing and capsule. The mounting connection can accommodate a wide variety of substantial deformations of the protective housing without transmittal of forces or deformations to the capsule itself. As a consequence of this particular and improved mounting arrangement described above, there is achieved an isolation of the sensor assembly which is highly desirable in accurate pressure transducer applications.

In addition to the above-described mounting means of the present invention, there is furthermore provided by the present invention additional improvements in mounting for compensating accelerating forces which may be applied to the transducer. It will be appreciated that acceleration forces of either a steady nature or of a vibratory nature, will stress materials of the device, and will consequently normally generate strains which will be experienced by the sensor itself, so that output signals are produced proportional to these acceleration forces. Quite clearly, such output signals constitute error signals, inasmuch as it is desired to measure pressure under circumstances being discussed, rather than to measure acceleration forces. The particular means provided hereby for compensation of acceleration forces in the sensor assembly is illustrated as to a preferred embodiment thereof in FIG. 3 of the drawing. Before referring to the details of this illustration, it is noted that although a variety of different sensing elements may be employed in connection with the mounting means of the present invention, particular advantage lies in the utilization of a semiconductor sensing device. In this respect, there is described below one transducer element suitable for utilization in the strain gauge of the present invention.

Figure 4:
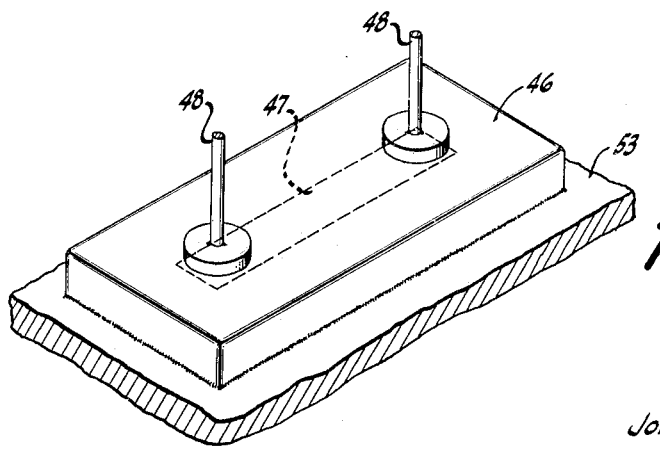
FIG. 4 is a partial perspective view of a sensor element for use in the strain gauge hereof.

There is illustrated in FIG. 4 a perspective view of a portion of one side of the beam 53 of the sensor assembly. The illustration of FIG. 4 is materially enlarged for the purpose of description, and referring thereto, it will be seen that one sensor may be composed of a single, flat wafer of semiconducting material such as silicon, directly bonded to the planar surface of a beam 53. It is well recognized that the application of stresses to a semiconductor, such as the silicon wafer illustrated in FIG. 4, will vary the electrical conductivity thereof. The sensor element illustrated includes a wafer 46 of semiconducting material having an impurity diffused therethrough so as to establish, for example, a P-type semiconductor thereof. Into this wafer 46 there is diffused a layer of N-type semiconductor 47. This diffusion may be accomplished by conventional means wherein conventional impurities are controllably diffused into the upper surface of the wafer in a limited area of the top surface thereof, reference in this respect being made to the transistor arts for a fuller description of the manner of establishing varying zones of P and N conductivity in a semiconductor wafer. There are provided a pair of ohmic contacts 48 engaging separated points of this diffused zone 47 in the wafer 46. Again, reference is made to conventional transistor technology regarding the application of ohmic or non-rectifying electrical contacts to semiconductors. In accordance with conventional practice, the wafer 46 is monocrystalline, and in accordance with strain gauge practices the sensor portion herein comprising layer 47 is oriented along one crystal axis of the silicon crystal. By the diffusion of a selected impurity into the wafer, there will be produced a rectifying or P-N junction between the layer and the remainder of the wafer, and it is noted in this respect that the layer is not diffused entirely through the wafer, but instead, is entirely isolated from the beam 53 by opposite conductivity semiconductor material of the wafer itself.

With the application of stresses to the beam 53, there will be experienced certain strains in the sensor 54, so that the electrical conductivity between the ohmic contacts 48 in the layer 47 of the wafer will vary. By the application of a known and constant voltage across these ohmic contacts, it will thus be seen that the current flowing therebetween will vary in accordance with the magnitude of stresses experienced by the beam to which the sensor is attached. In accordance with advanced and improved practices, it is preferable for the wafer 46 to be fully protected against degradation of surface characteristics by the application of a protective layer over the wafer. Although this is not fully illustrated in the figure, it is herein stated that there may be employed a silicon oxide coating over the wafer, and over the P-N junction about the layer 47 in the wafer at the upper surface of this wafer. Suitable openings in this protective coating afford access to the layer for ohmic contact thereto by the contacts 48. In this manner the properties and characteristics of the sensor itself are prevented from varying with time or environmental changes, as would otherwise occur. It will be seen that the layer of semiconductor material 47 herein employed as the sensor of the strain gauge is electrically isolated from the beam 53 by the P-N junction existing between this diffused layer 47 and the remainder of the wafer 46. Even though the wafer 46 is directly bonded to the beam by electrically conducting means, there yet remains between the layer and beam a substantial impedance afforded by the P-N junction. In this manner there may be employed a direct connection of the sensor to the beam without regard to the necessity of affording electrical insulation between the sensor and beam. As described below, it may yet be desirable to electrically isolate the beam 53 in the event that the strain gauge hereof is to be employed under circumstances wherein substantial electrical transients may occur. In this manner the measuring system of the gauge is wholly isolated from extraneous influences.

Figure 3:
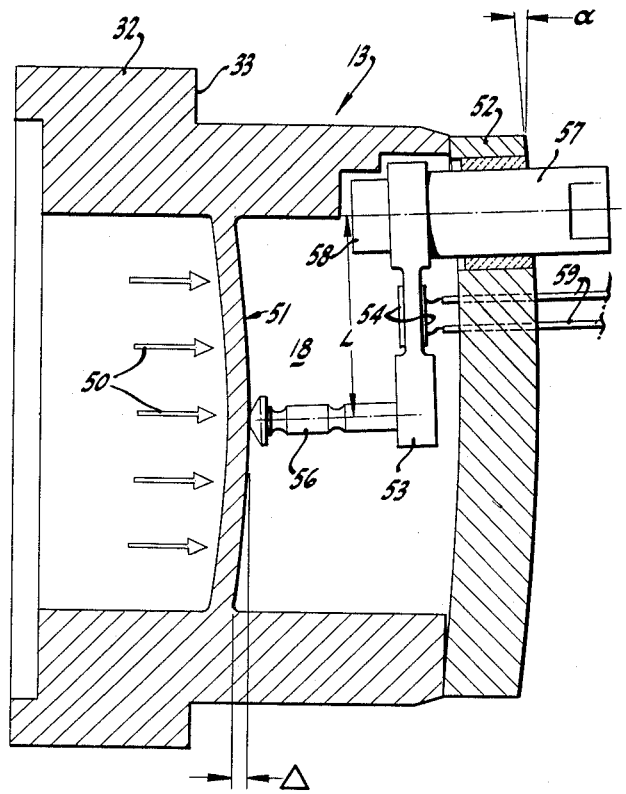
FIG. 3 is an enlarged longitudinal sectional view of the pressure transducer capsule and elements enclosed therein.

Referring to FIG. 3, it will be seen to be illustrated in some detail the capsule 13 housing the sensor assembly 18 of the present invention. This capsule, as above described, is formed as a cylinder having an external flange 32 about the forward end thereof for mounting of the capsule within a protective housing. The capsule further includes a transverse diaphragm 51 inset from the forward end of the capsule, and having the front face thereof available for the application of pressure through the pressure port 16 of the protective housing. There is illustrated in FIG. 3 by the arrows 50, pressure being applied to this diaphragm 51, and an exaggerated bowing of the diaphragm is shown in FIG. 3 as being illustrative of the effect of the application of pressure to the left or forward side of this diaphragm. This exaggerated curvature of the diaphragm will be seen to be illustrative of the deflection of the diaphragm with the application of forces to the front side thereof.

The capsule 13 is closed by a back plate 52 boiled to the cylindrical portion of the capsule, and the sensor assembly is mounted upon this back plate within the capsule. The sensor assembly 18 includes a beam 53 having a central portion of reduced cross-section upon which is mounted a sensor 54 such as the one described above. One end of the beam 53 is fixed and the other end is free for deflection in accordance with deflection of the diaphragm 51, so as to stress the sensor to produce electrical signals related to the applied stress. A force link 56 extends along the axis of the capsule between the diaphragm 51 and the free end of the beam to transmit diaphragm deflection to the beam. This force link may have an enlarged head engaging the diaphragm and may be rigidly joined at the opposite end to the free end of the beam. Also, the force link may have an insulating portion therein where it is desired to electrically insulate the beam from the capsule.

Mounting of the beam 53 upon the back plate 52 is accomplished at the outer periphery of this plate, for reasons set forth below. A portion of the capsule wall is cut out to provide space for mounting of the beam at the outer radius of the plate, and this mounting may also include insulation for electrically insulating the beam from the capsule. The mounting may, for example, include an insulating insert 57 fused into the back plate and secured to the beam by a bolt 58. Pins 59 extend in insulated relation through the back plate for electrical connection between the sensor and circuitry outside the capsule.

Flexing of the beam 53 will be seen to produce strains which are transduced by the sensor into electrical signals that are, in turn, fed out of the sensor assembly and capsule to appropriate circuitry. Deflection of the beam results from deflection of the diaphragm 51 as transmitted through the force link 56 to the beam. With a rigid beam mounting in laterally offset position from the axis of the capsule, it will be appreciated that forces applied axially of the force link will thus deflect the beam and consequently actuate the transducer or sensor 54.

With regard to the application of acceleration forces to the sensor assembly, it will be seen that the forces indicated by the arrows 50 as being applied to the diaphragm 51 may equally well comprise acceleration forces. Such acceleration forces will deflect this diaphragm and consequently will transmit a deflection through the force link to the beam 53, and with a rigid mounting of the beam at the outer end thereof will consequently produce strains which vary electrical properties of the sensor 54, and consequently produce output indications in the electrical system attached thereto. Such output indications will be seen to comprise a source of error in a pressure transducer subject to acceleration. The present invention provides for overcoming this source of error by the particular offset mounting arrangement above described. As shown and described above, the beam 53 carrying the sensor 54 is located along a radius of the cylindrical capsule 13, and is rigidly mounted to the rear plate 52 adjacent the outer edge thereof. Also, this beam contacts the force link at the axis of the capsule. The deflection of the diaphragm 51 or of any other part of the apparatus or device, such as for example, the rear plate 52, when subject to acceleration forces will be seen to be a function of the mass of the individual element deflected, as well as the spring constant thereof. Consequently, the rear plate 52 will also deflect in the same general manner as the diaphragm 51 when subject to like acceleration forces. Acceleration of the device will produce an angular deflection $\alpha$ of the rear plate 52. With an incremental axial deflection $\Delta$ of the diaphragm 51 under a particular accelerating force, the beam length L between the point of contact between the beam and the force link and the point of mounting of the beam is made such that the product of beam length and angle $\alpha$ equals a corresponding beam deflection of $\Delta$, and thus there is cancelled out any output otherwise resulting from acceleration forces.

Further with regard to the cancellation or counteraction of acceleration effects on the strain gauge pressure transducer hereof, it is noted that the beam is mounted at the outer edge of the back plate 52. Consequently, deflection of this back plate will produce a pivoting of the mounting rather than any substantial translation thereof axially of the capsule. The angle through which the beam mounting pivots for a particular acceleration is substantially equal to the angle of plate deflection $\alpha$. Movement of the lower end of the beam by this deflection of the back plate and consequent pivoting of the beam mounting will thus be equal to L sin $\alpha$. Only very minute deflections are herein involved, and consequently the angle $\alpha$ is extremely small. Thus, the angle $\alpha$ in radians may be directly substituted for sin $\alpha$, so that the beam movement at the axis of the capsule is substantially equal to L$\alpha$. By appropriate construction and choice of materials in the cover plate 52, the deflection $\alpha$ of this plate under acceleration forces is chosen so that L$\alpha$ equals $\Delta$, the deflection of the diaphragm 51 under the same acceleration force.

It will be seen from the foregoing that there is provided hereby a simplified means for counteracting acceleration effects. Actual deflection of capsule elements under acceleration forces is accepted and the effects upon the transducer are counteracted. In direct contradiction to prior-art approaches to this problem, the present invention does not provide for the utilization of massive structures for the purpose of minimizing deflections, but instead, employs only lightweight simplified structures wherein acceleration effects are counteracted rather than minimized. With the lower point of the beam in contact with the force link being moved through its mounting an amount equal to the movement of the force link by deflection of the diaphragm 51 through acceleration forces, it will be appreciated that the transducer 54 mounted upon the beam will thus experience no stresses from acceleration forces, and consequently, will not produce output indications from acceleration. With regard to the production of output signals for pressure variations, it will be appreciated that the diaphragm 51 is alone acted upon by pressure effects in front of same, and that the rear cover plate 52 does not move in response to pressure variations through the port 16 in the front of the housing. Consequently, deflection of this diaphragm 51 by the application of an increased pressure, for example, in front of the plate as indicated by the arrows 50, will cause the force link 56 to move axially of the capsule toward the rear thereof and consequently to deflect the beam 53, so that the sensor 54 is stressed and does experience a strain which varies the electrical characteristics thereof so that output signals result.

There is described above one preferred embodiment of the improved mounting means of the present invention. It will be seen that there is herein provided a light-weight and relatively simplified structure, which yet fully attains the objects of the present invention. Very substantial and highly advantageous protection of the sensor assembly and enclosing capsule is achieved by the limiting of capsule and housing contact to a single surface disposed transversely of the longitudinal axis of the housing. Furthermore, there is provided a simplified and highly accurate compensation for acceleration effects, so that the sensor element of the transducer is substantially unaffected by steady-state or vibratory acceleration effects acting upon the housing and sensor assembly. The mass and spring constant of the rear plate 52 of the capsule 13 may be readily determined and related to the like characteristics of the diaphragm 51, so that the beam 53 upon which the sensor 54 is mounted remains unstressed during acceleration of the pressure transducer.

What is claimed is:

1. An improved sensor mounting in a pressure transducer capsule having a pressure-sensitive front wall and a rear wall, comprising a beam adapted to have a sensor secured thereto, a rigid force link contacting said front wall and mounted within the capsule for movement in response to deflection of said front wall, and means rigidly mounting said beam upon said back wall in extension transversely of the capsule into engagement with said force link to receive forces applied thereto by said force link, the point of said beam mounting upon said back wall being laterally offset from said force link a distance which when multiplied by angular deflection of the back wall from acceleration forces substantially equals the deflection of the front wall from the same acceleration forces to thereby substantially reduce sensor output from acceleration forces.

2. An improved pressure transducer comprising a capsule having a diaphragm closing a front end thereof, a force link engaging said diaphragm, means mounting said link for movement axially of said capsule, a beam extending transversely of said capsule within same in contact with said force link upon the capsule axis and adapted to have at least one strain-sensitive element mounted thereon, a rear wall upon said capsule, and means mounting said beam upon said rear wall at the outer periphery thereof to define an effective beam length L between mounting and force link contact, said rear wall having predetermined physical characteristics to deflect an angle $\alpha$ upon longitudinal acceleration of the capsule, such that $L\alpha$ equals a deflection of said diaphragm at the capsule axis from the same capsule acceleration, whereby said beam is substantially isolated from stresses from acceleration of the capsule.

3. An improved compensated pressure transducer comprising a capsule having a front diaphragm adapted to experience pressure variations for deflection in accordance therewith, a rear wall upon said capsule and secured thereto for defining a central enclosure therein; and a sensor assembly disposed within the enclosure of said capsule and including a beam disposed substantially radially of the capsule and securely mounted at the outer end of the beam to said rear wall at the outer periphery thereof, at least one strain-sensitive element mounted upon said beam for producing indications of beam stresses, and means mounted axially of said capsule between the inner end of the beam and the capsule diaphragm for transmitting diaphragm deflections to the beam, whereby deflection of the capsule diaphragm and rear wall through acceleration forces pivots the beam to substantially reduce the application of forces to the inner beam end by diaphragm deflection from acceleration.

References Cited by the Examiner
UNITED STATES PATENTS

| | | | |
|---|---|---|---|
| 2,482,440 | 9/49 | Rylsky. | |
| 2,678,986 | 5/54 | Ward | 73—398 |
| 2,759,361 | 8/56 | Rich | 73—398 |
| 2,772,569 | 12/56 | Ruge | 73—398 |
| 2,969,677 | 1/61 | Lewis | 73—398 |
| 3,049,685 | 8/62 | Wright | 73—88.5 |
| 3,058,348 | 10/62 | Statham | 73—398 |

RICHARD C. QUEISSER, *Primary Examiner.*

ROBERT L. EVANS, *Examiner.*